United States Patent
Li et al.

(10) Patent No.: US 11,257,277 B2
(45) Date of Patent: Feb. 22, 2022

(54) METHODS AND APPARATUS TO FACILITATE ADAPTIVE TEXTURE FILTERING

(71) Applicant: QUALCOMM Incorporated, San Diego, CA (US)

(72) Inventors: Liang Li, San Diego, CA (US); Andrew Evan Gruber, Arlington, MA (US); Yunshan Kong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/912,479

(22) Filed: Jun. 25, 2020

(65) Prior Publication Data

US 2020/0410743 A1    Dec. 31, 2020

Related U.S. Application Data

(60) Provisional application No. 62/867,131, filed on Jun. 26, 2019.

(51) Int. Cl.
*G06T 15/04* (2011.01)
*G06T 1/20* (2006.01)
*G06T 5/00* (2006.01)

(52) U.S. Cl.
CPC ............. *G06T 15/04* (2013.01); *G06T 1/20* (2013.01); *G06T 5/001* (2013.01); *G06T 2207/20024* (2013.01)

(58) Field of Classification Search
None
See application file for complete search history.

(56) References Cited

U.S. PATENT DOCUMENTS

| | | | | |
|---|---|---|---|---|
| 5,920,495 A * | 7/1999 | Hicok | ...................... | G06T 5/20 |
| | | | | 708/308 |
| 6,040,837 A * | 3/2000 | Wong | ...................... | G06T 15/04 |
| | | | | 345/586 |
| 6,535,232 B1 * | 3/2003 | Tsuda | ...................... | G06T 13/00 |
| | | | | 345/427 |
| 7,372,467 B1 * | 5/2008 | Toksvig | .................. | G06T 15/04 |
| | | | | 345/582 |
| 7,782,334 B1 * | 8/2010 | Kilgard | .................... | G06T 1/00 |
| | | | | 345/582 |

(Continued)

*Primary Examiner* — Jason A Pringle-Parker
(74) *Attorney, Agent, or Firm* — Procopio, Cory, Hargreaves & Savitch LLP

(57) ABSTRACT

The present disclosure relates to methods and apparatus for graphics processing. In some aspects, the apparatus selects a first mip-map layer with a first texture size and a second mip-map layer with a second texture size based on a third texture size of an image. The apparatus also determines a relative distance associated with the texture sizes. Additionally, the apparatus determines a first quantity of samples to select from the first mip-map layer, and determines a second quantity of samples to select from the second mip-map layer, the second quantity of samples being less than the first quantity of samples, and a second quantity of filter taps being less than a first quantity of filter taps. Also, the apparatus generates the image at the third texture size through filtering based on the first quantity of samples and the second quantity of samples.

22 Claims, 9 Drawing Sheets

(56) References Cited

U.S. PATENT DOCUMENTS

| | | | |
|---|---|---|---|
| 2008/0074435 A1* | 3/2008 | Sekine | G06T 15/04 345/582 |
| 2014/0267345 A1* | 9/2014 | Toth | G06T 15/04 345/582 |
| 2015/0178975 A1* | 6/2015 | Chatterjee | G06T 15/04 345/587 |

* cited by examiner

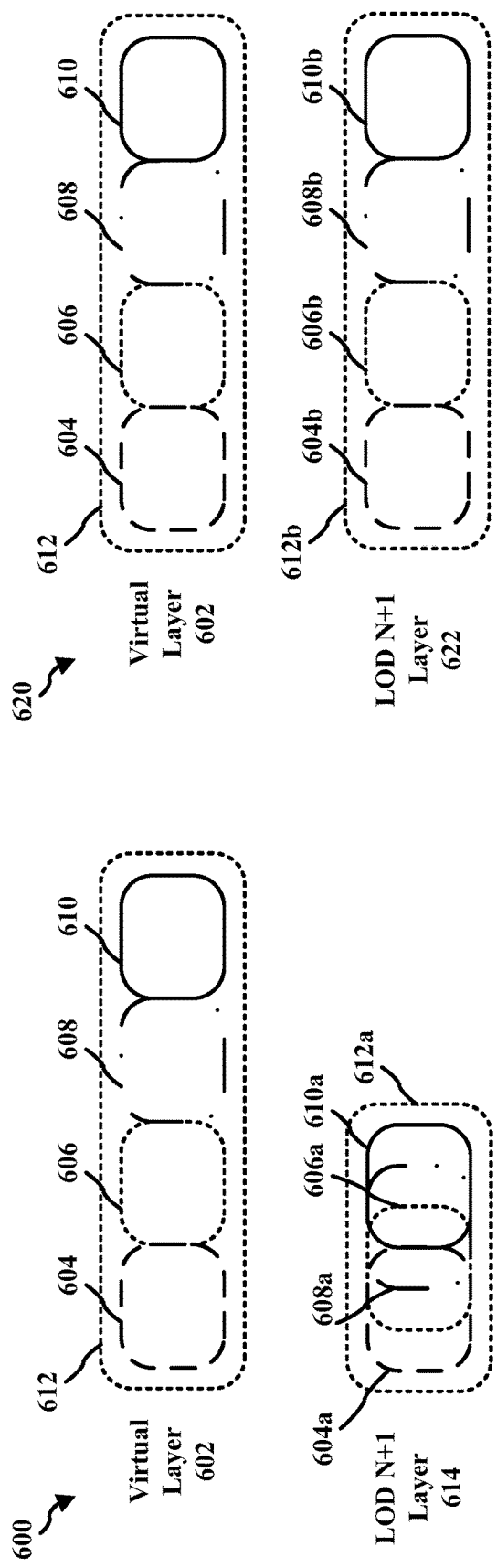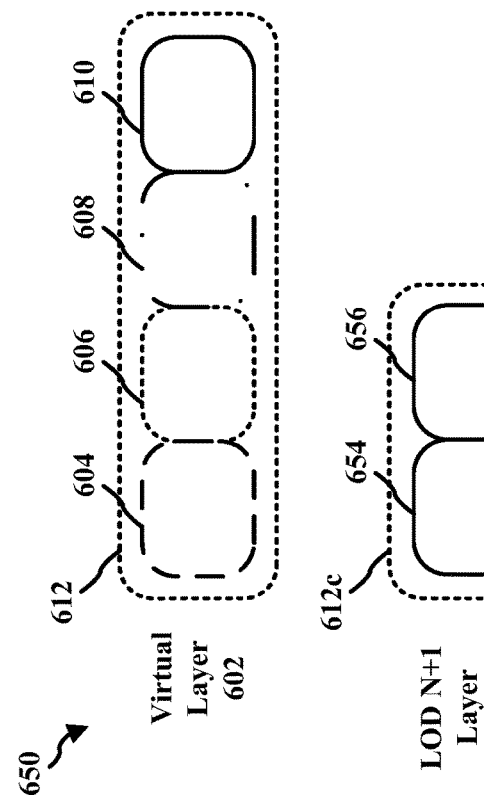

METHODS AND APPARATUS TO FACILITATE ADAPTIVE TEXTURE FILTERING

CROSS REFERENCE TO RELATED APPLICATION(S)

This application claims the benefit of U.S. Provisional Patent Application Ser. No. 62/867,131, entitled "Methods And Apparatus To Facilitate Adaptive Texture Filtering" and filed on Jun. 26, 2019, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. An application processor or a central processing unit (CPU) may control the operation of the GPU by issuing one or more graphics processing commands to the GPU. Modern day CPUs are typically capable of concurrently executing multiple applications, each of which may need to utilize the GPU during execution.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU). In some aspects, the apparatus may be configured to select a first mip-map layer with a first texture size and a second mip-map layer with a second texture size based on a third texture size of an image, the first texture size being larger than the third texture size, the second texture size being smaller than the third texture size. The apparatus may also be configured to determine a relative distance associated with the third texture size from the first texture size with respect to the second texture size. Additionally, the apparatus may be configured to determine a first quantity of samples to select from the first mip-map layer, the first quantity of samples comprising a first quantity of filter taps. The apparatus may further be configured to determine a second quantity of samples to select from the second mip-map layer based on a relationship between the determined relative distance and the first quantity of samples of the first mip-map layer, the second quantity of samples comprising a second quantity of filter taps. In some examples, the second quantity of samples may be less than the first quantity of samples, and the second quantity of filter taps may be less than the first quantity of filter taps. Additionally, the apparatus may be configured to generate the image at the third texture size through filtering based on the first quantity of samples of the first mip-map layer and the second quantity of samples of the second mip-map layer.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6A depicts a first example illustration of samples at a higher mip-map layer, in accordance with one or more techniques of this disclosure.

FIG. 6B depicts a second example illustration of samples at a higher mip-map layer, in accordance with one or more techniques of this disclosure.

FIG. 6C depicts a third example illustration of samples at a higher mip-map layer, in accordance with one or more techniques of this disclosure.

DETAILED DESCRIPTION

Figure 1:
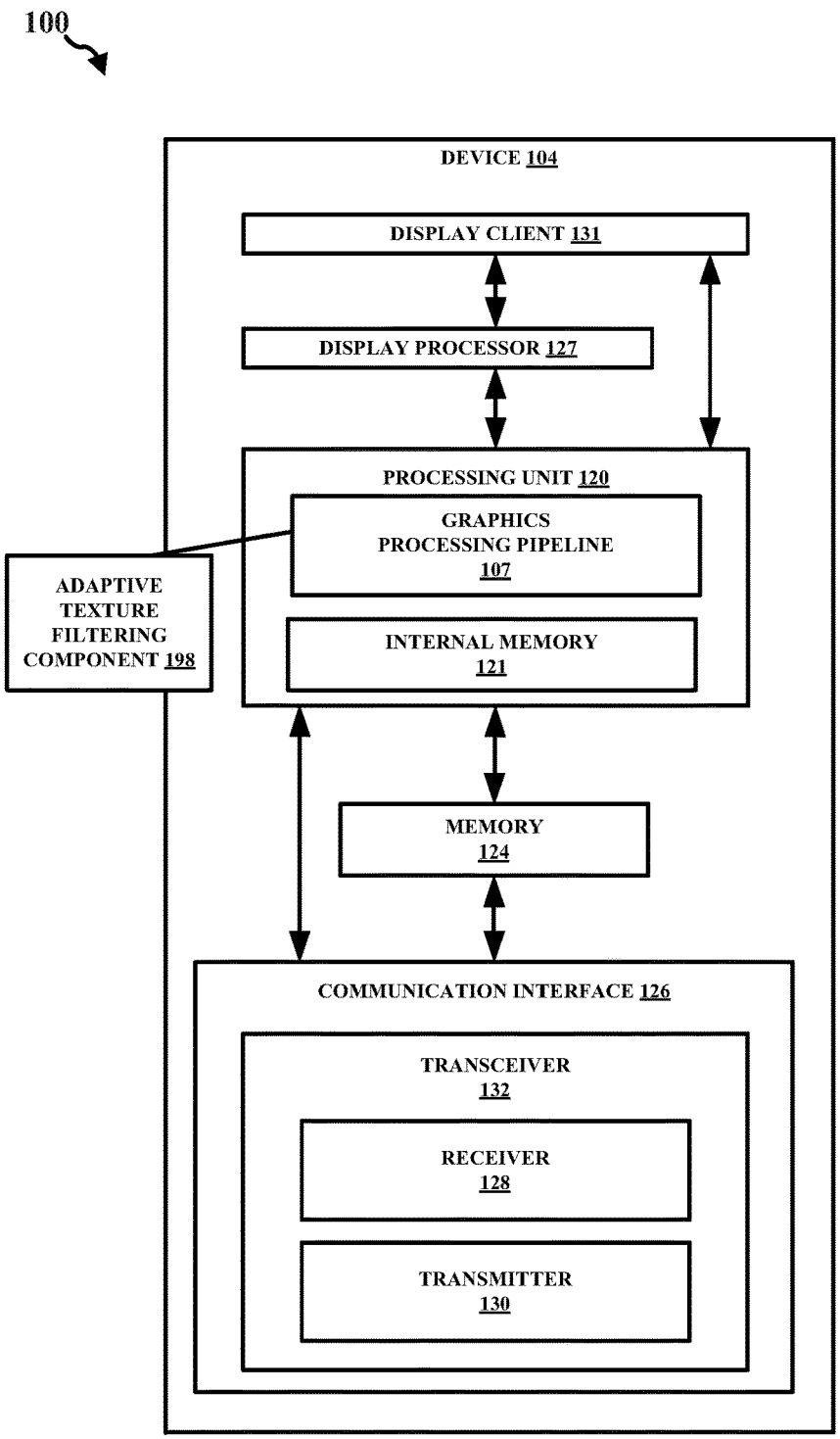
FIG. 1 is a block diagram that illustrates an example content generation system, in accordance with one or more techniques of this disclosure.

To facilitate trilinear filtering and/or anisotropic filtering, some example techniques compute a desired image size and select two mip-map layers that are closest to the desired image size. For example, disclosed techniques select a first mip-map layer (e.g., an N layer) that has a larger footprint than the desired image size and provides more detail (e.g., higher resolution) than the desired image size. Disclosed techniques also select a second mip-map layer (e.g., an N+1 layer) that has a smaller footprint than the desired image size and provides less detail (e.g., lower resolution) than the desired image size. Examples may then fetch texels to sample from the corresponding mip-map layers. In some examples, each sample may be associated with a respective quantity of filter taps that are used for performing texture filtering. Additionally, in some examples, the quantity of samples from each mip-map layer may be the same. Thus, for example, if four samples are selected from the N layer, then four samples are also selected from the N+1 layer. Furthermore, if each sample corresponds to one cycle, then in the this example, eight cycles may be used for sampling the two mip-map layers. Moreover, if each sample is associated with Z filter taps, then 8*Z total filter taps may be input into a texture filter for processing.

Example techniques disclosed herein facilitate reducing the quantity of samples needed for performing texture filtering. For example, example techniques disclosed herein enable selecting a first quantity of samples for a lower mip-map layer (e.g., the N layer) and selecting a second quantity of samples for a higher mip-map layer (e.g., the N+1 layer). As disclosed herein, the second quantity of samples may be less than the first quantity of samples and, thus, the total quantity of samples may be less than twice the first quantity of samples. Additionally, as the total quantity of samples is reduced, the total quantity of filter taps associated with performing the texture filter may also be reduced. Accordingly, example techniques disclosed herein facilitate reducing the quantity of samples and filter taps and, thereby, may improve workflow, may improve performance, and/or may improve power consumption.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/ or reducing the load of a processing unit (e.g., any processing unit configured to perform one or more techniques described herein, such as a GPU). For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (e.g., the frame includes two or more layers, and the frame that includes two or more layers may subsequently be blended).

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120 and a memory 124. In some aspects, the device 104 can include a number of optional components, such as a communication interface 126, a transceiver 132, a receiver 128, a transmitter 130, a display processor 127, and a display client 131.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the display client 131. The display processor 127 may be configured to perform display processing. For example, the display processor 127 may be configured to perform one or more display processing techniques on one or more frames generated by the processing unit 120. The display processor 127 may output image data to the display client 131 according to an interface protocol, such as the MIPI DSI (Mobile Industry Processor Interface, Display Serial Interface) standards.

The display client 131 may be configured to display or otherwise present frames processed by the processing unit 120 (and/or the display processor 127). In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

Reference to the display client 131 may refer to one or more displays. For example, the display client 131 may include a single display or multiple displays. The display client 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

Furthermore, as disclosed above, the display client 131 may be configured in accordance with MIPI DSI standards. The MIPI DSI standard supports a video mode and a command mode. In examples where the display client 131 is operating in video mode, the processing unit 120 (and/or the display processor 127) may continuously refresh the graphical content of the display client 131. For example, the entire graphical content may be refreshed per refresh cycle (e.g., line-by-line).

In examples where the display client 131 is operating in command mode, the processing unit 120 (and/or the display processor 127) may write the graphical content of a frame to a buffer. In some such examples, the processing unit 120 (and/or the display processor) may not continuously refresh the graphical content of the display client 131. Instead, the processing unit 120 (and/or the display processor) may use a vertical synchronization (Vsync) pulse to coordinate rendering and consuming of graphical content at the buffer. For example, when a Vsync pulse is generated, the processing unit 120 (and/or the display processor 127) may output new graphical content to the buffer. Thus, the generating of the Vsync pulse may indicate when current graphical content at the buffer has been composited.

Memory external to the processing unit 120, such as memory 124, may be accessible to the processing unit 120. For example, the processing unit 120 may be configured to read from and/or write to external memory, such as the memory 124. The processing unit 120 may be communicatively coupled to the memory 124 over a bus. In some examples, the processing unit 120 and the memory 124 may be communicatively coupled to each other over the bus or a different connection.

The internal memory 121 and/or the memory 124 may include one or more volatile or non-volatile memories or storage devices. In some examples, the internal memory 121 and/or the memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 and/or the memory 124 may be a non-transitory storage medium according to some examples. The term "non-transitory" may indicate that the storage medium is not embodied in a carrier wave or a propagated signal. However, the term "non-transitory" should not be interpreted to mean that the internal memory 121 and/or the memory 124 is non-movable or that its contents are static. As one example, the memory 124 may be removed from the device 104 and moved to another device. As another example, the memory 124 may not be removable from the device 104.

The processing unit 120 include a central processing unit (CPU), an application processor, a graphics processing unit (GPU), a graphics processor, a general purpose GPU (GPGPU), a display processing unit (DPU), a display processor, and/or any other processing unit that may be configured to perform display or graphics processing.

In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, CPUs, application processors, GPUs, graphics processors, DSPs, display processors, image signal processors (ISPs), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., the internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include a communication interface 126. The communication interface 126 may include a receiver 128 and a transmitter 130. The receiver 128 may be configured to perform any receiving function described herein with respect to the device 104. Additionally, the receiver 128 may be configured to receive information (e.g., eye or head position information, rendering commands, or location information) from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may be configured to operate functions related to a graphics processing pipeline 107 and may include an adaptive texture filtering component 198 configured to dynamically determine a quantity of samples to use for generating an image. For example, the adaptive texture filtering component 198 may be configured to select a first mip-map layer with a first texture size and a second mip-map layer with a second texture size based on a third texture size of an image, the first texture size being larger than the third texture size, the second texture size being smaller than the third texture size. The adaptive texture filtering component 198 may also be configured to determine a relative distance associated with the third texture size from the first texture size with respect to the second texture size. Additionally, the adaptive texture filtering component 198 may be configured to determine a first quantity of samples to select from the first mip-map layer, the first quantity of samples comprising a first quantity of filter taps. The adaptive texture filtering component 198 may also be configured to determine a second quantity of samples to select from the second mip-map layer based on a relationship between the determined relative distance and the first quantity of samples of the first mip-map layer, the second quantity of samples comprising a second quantity of filter taps. In some examples, the second quantity of samples may be less than the first quantity of samples, and the second quantity of filter taps may be less than the first quantity of filter taps. The adaptive texture filtering component 198 may also be configured to generate the image at the third texture size through filtering based on the first quantity of samples of the first mip-map layer and the second quantity of samples of the second mip-map layer.

As described herein, a device, such as the device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, wireless communication device, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a CPU), but, in further embodiments, can be performed using other components (e.g., an application processor or a GPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As the context state is updated, the corresponding mode or state may be changed accordingly. Additionally, the workload that corresponds to the mode or state may be updated based on the changing mode or state.

Figure 2:
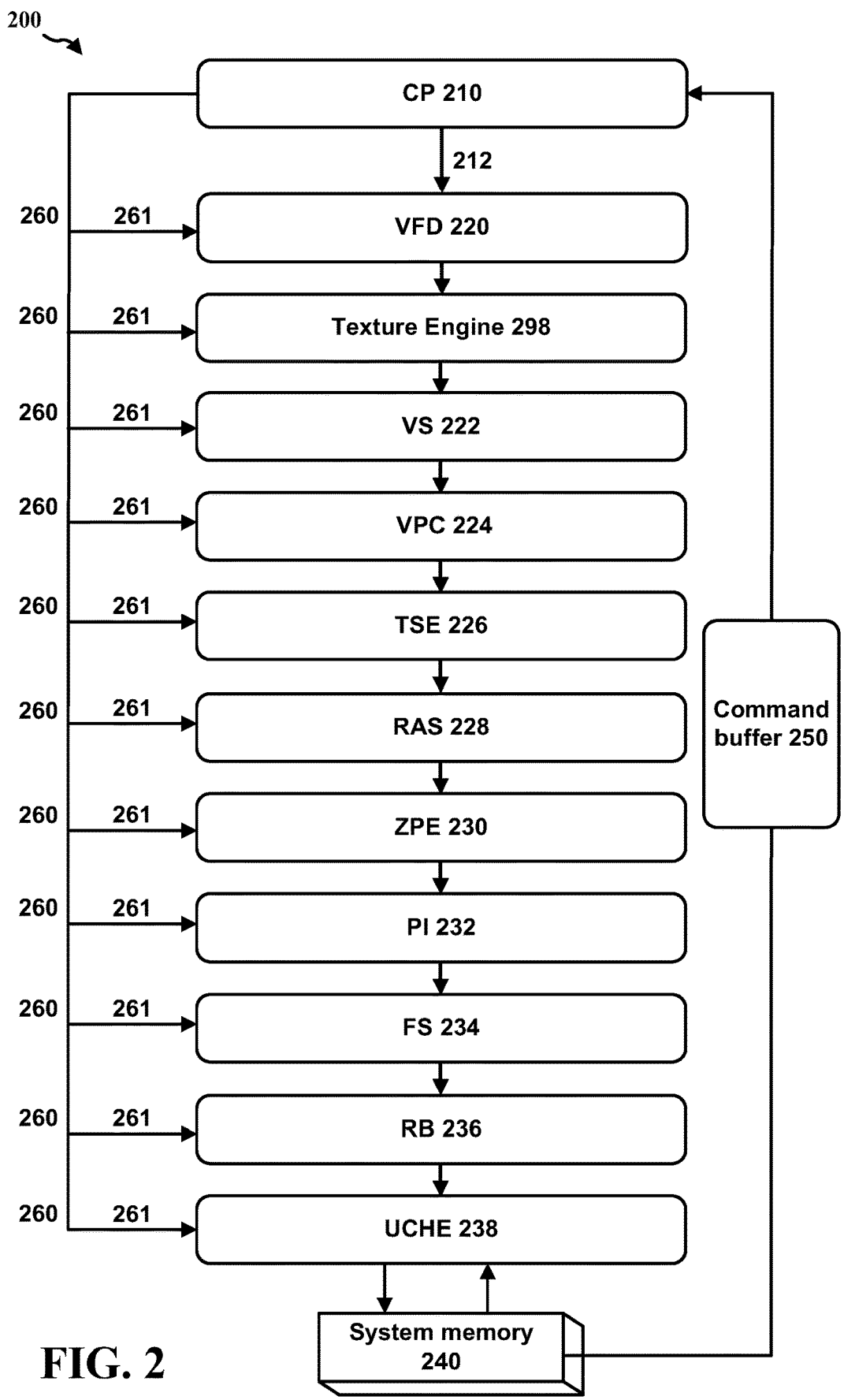
FIG. 2 illustrates an example GPU, in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, texture engine 298, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and memory 240. Although FIG. 2 displays that GPU 200 includes processing units 210-238, GPU 200 can include a quantity of additional or fewer processing units. Additionally, processing units 210-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can be structured as follows: context register of context N, draw call(s) of context N, context register of context N+1, and draw call(s) of context N+1.

In some aspects, for each GPU processing unit or block, a context register may need to be prepared before any draw call data can be processed. As context registers and draw calls can be serialized, it can be helpful to have an extra context register prepared before the next draw call. In some instances, draw calls of the next context can be fed through the GPU data pipeline in order to hide context register programming latency. Further, when a GPU is equipped with multiple sets of context registers, each processing unit can have sufficient context switching capacity to manage smooth context processing. In turn, this can enable the GPU to cover pipeline latency that can result from unpredictable memory access latency and/or extended processing pipeline latency.

The demand for high quality and high resolution digital images continues to increase. Since high quality and high resolution digital images typically have large data sizes, hardware efficiency for performing image processing tasks becomes more important. One such image processing task is image filtering.

GPUs may render three-dimensional images made of polygons and/or process two-dimensional arrays of pixels. A GPU may apply and render one or more textures to each polygon of an image. As part of the rendering of the image, the GPU may be configured to filter the textures, for example, before converting a three-dimensional representation of the image to a two-dimensional grid of pixels. GPUs may also be configured to filter two-dimensional image data (e.g., arrays of pixels).

Texture filtering or texture smoothing may be used to determine the texture color for a texture mapped pixel using the colors of nearby texels. In general, texels (also referred to as texture elements) may be the fundamental units of texture space. A texture may be represented by an array of texels, which contain color and/or alpha values (e.g., transparency values or opacity values) for a particular texture in a particular color space. In some examples, texture filtering may be considered to be a type of anti-aliasing. In general, texture filtering allows a texture to be applied at many different shapes, sizes, and/or angles, while minimizing blurriness, shimmering, and blocking. Example texture filtering techniques include bilinear filtering and trilinear filtering.

Bilinear filtering determines the color of a pixel by interpolating the closest four texels to the pixel center in an area of the texture mapped polygon sampled by the pixel. Trilinear filtering uses bilinear filtering on the two closest mip-map layers, and then interpolates those results to determine the pixel color. Multum in parvo (mip) maps may be used to reduce aliasing and increase rendering speed. In some examples, the mip-maps may be a set of images that represent the texture of an original image at a different level of detail (LOD) for each mip-map. In some examples, the mip-maps may be pre-generated to reduce processing time.

Figure 3:
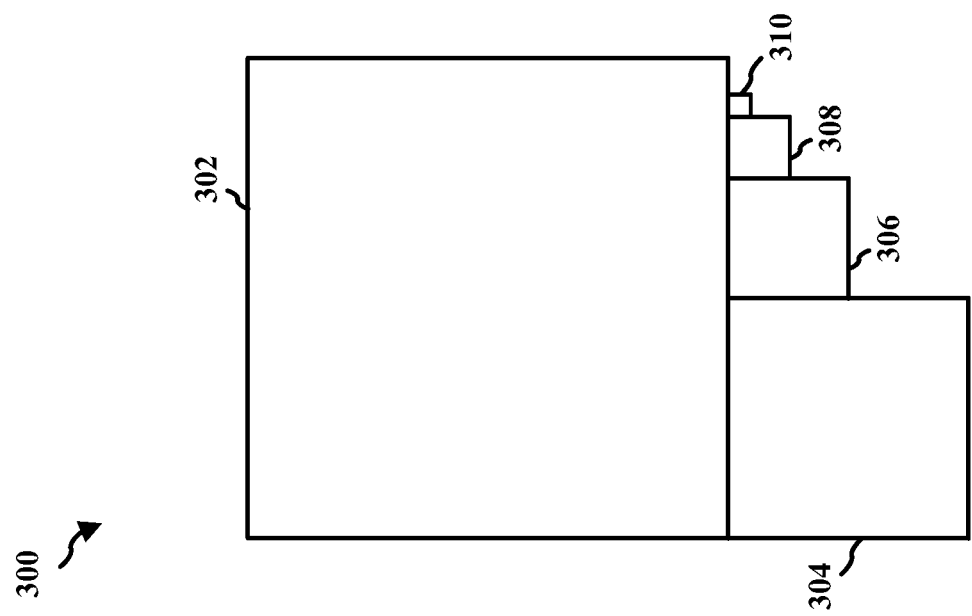
FIG. 3 illustrates an example mip-map image configuration, in accordance with one or more techniques of this disclosure.

FIG. 3 illustrates an example mip-map image configuration 300. A mip-map is an ordered set of texture maps that each store texture data representing a predetermined texture image (e.g., an original image). The set of texture maps (or mip-map layers) provides a range of resolutions or levels of detail of the original texture image. Each mip-map may be a 2-D array of data elements that store texture data representing the original texture image.

In the illustrated example of FIG. 3, the mip-map image configuration 300 includes five example mip-map layers 302, 304, 306, 308, 310. Each mip-map layer in succession provides less detail of the original texture image. For example, a first mip-map layer 302 (also referred to as a base texture map) provides the highest resolution of the original texture image. A second mip-map layer 304 is a scaled down version of the first mip-map layer 302 with half as many texels along each dimension (or axis) and, thus, provides one-quarter as many texels. This four-to-one texel area scaling continues to the next mip-map layers 306, 308, 310, respectively, of the mip-map image configuration 300.

For illustrative purposes, the first mip-map layer 302 corresponds to a 16×16 size texture map. The first mip-map layer 302 corresponds to the original texture image and may be referred to as LOD=0. The second mip-map layer 304 corresponds to an 8×8 size texture map and may be referred to as the LOD=1. The third mip-map layer 306 corresponds to a 4×4 size texture map and may be referred to as the LOD=2. The fourth mip-map layer 308 corresponds to a 2×2 size texture map and may be referred to as the LOD=3. The fifth mip-map layer 310 corresponds to a 1×1 size texture map and may be referred to as the LOD=4. Thus, in the examples described herein, when comparing two mip-map layers, the higher detailed (or higher resolution) mip-map layer is referred to as the LOD N layer and the lower detailed (or lower resolution) mip-map layer is referred to as the LOD N+1 layer.

It may be appreciated that while the different mip-map layers of the mip-map image configuration 300 are illustrated as square sizes, in other examples, the different mip-map layers of the mip-map image configuration 300 may be any other appropriate size or shape. Furthermore, it may be appreciated that while the mip-map image configuration 300 of FIG. 3 includes five mip-map layers, in other examples, the mip-map image configuration may include any suitable quantity of mip-map layers.

Referring again to FIG. 2, the texture engine 298 may include one or more hardware units that are configured to operate on one or more texture data. The texture engine 298 may include both programmable and fixed function hardware designed to apply textures (texels) to pixels. In some examples, the texture engine 298 may include a dedicated set of hardware units that are dedicated to operating on texture data, such as dedicated to performing texture filtering on texture data.

Texture data may include texture elements, also referred to as texels, which are the fundamental units of texture space. Texture data may be, but is not limited to, a one-dimensional, two-dimensional, or three-dimensional texture, or a one-dimensional, two-dimensional, or three-dimensional array of textures. The texture data may include multiple textures. In some examples, texture data may include an array of texels, which may contain color and alpha values for the corresponding texture data.

In operation, the texture engine 298 may perform texture filtering on texture data to determine a texture color for a texture mapped pixel (e.g., a pixel that is mapped from a screen space to the texture space) using colors of nearby texels. The texture engine 298 may output the result of operating on one or more texture data. In some examples, shader processors may instruct the texture engine 298 to perform operations on texture data, and the texture engine 298 may provide the results of operating on the texture data to the shader processors for further processing (e.g., for shading operations). The GPU 200 may then generate an image.

To facilitate trilinear filtering and/or anisotropic filtering, some example techniques compute a desired image size and select two mip-map layers that are closest to the desired image size. For example, disclosed techniques select a first mip-map layer (e.g., an N layer) that has a larger footprint than the desired image size and provides more detail (e.g., higher resolution) than the desired image size. Disclosed techniques also select a second mip-map layer (e.g., an N+1 layer) that has a smaller footprint than the desired image size and provides less detail (e.g., lower resolution) than the desired image size. Examples may then fetch texels to sample from the corresponding mip-map layers. In some examples, each sample may be associated with a respective quantity of filter taps that are used for performing texture filtering. Additionally, in some examples, the quantity of samples from each mip-map layer may be the same. Thus, for example, if four samples are selected from the N layer, then four samples are also selected from the N+1 layer. Furthermore, if each sample corresponds to one cycle, then in the this example, eight cycles may be used for sampling the two mip-map layers. Moreover, if each sample is associated with Z filter taps, then 8*Z total filter taps may be input into a texture filter for processing.

Example techniques disclosed herein facilitate reducing the quantity of samples needed for performing texture filtering. For example, example techniques disclosed herein enable selecting a first quantity of samples for a lower mip-map layer (e.g., the N layer) and selecting a second quantity of samples for a higher mip-map layer (e.g., the N+1 layer). As disclosed herein, the second quantity of samples may be less than the first quantity of samples and, thus, the total quantity of samples may be less than twice the first quantity of samples. Additionally, as the total quantity of samples is reduced, the total quantity of filter taps associated with performing the texture filter may also be reduced. Accordingly, example techniques disclosed herein facilitate reducing the quantity of samples and filter taps and, thereby, may improve workflow, may improve performance, and/or may improve power consumption.

Figure 4:
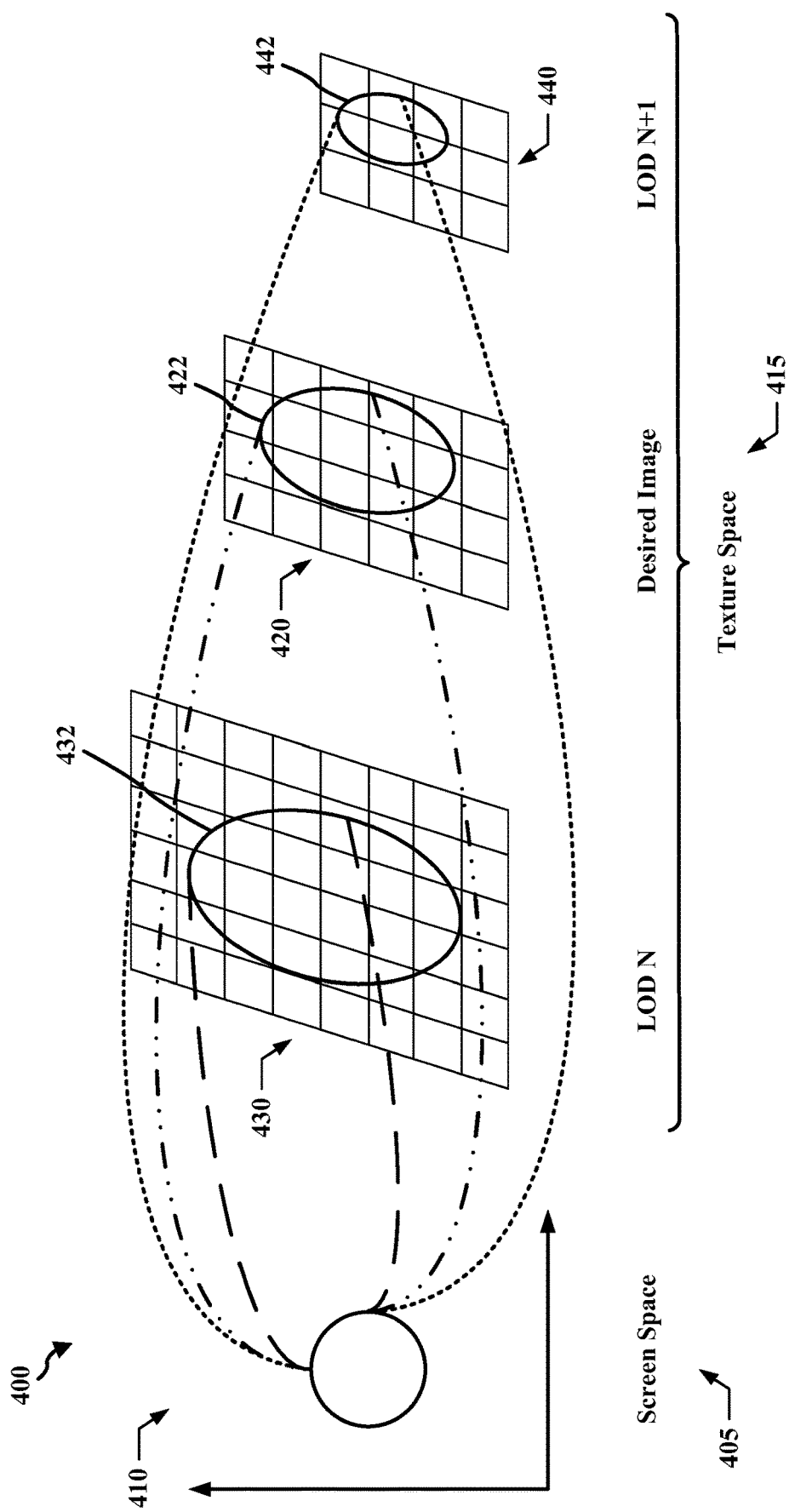
FIG. 4 and FIG. 5 depict example illustrations of projecting a pixel from a screen space to a texture space, in accordance with one or more techniques of this disclosure.

FIG. 4 depicts an example illustration 400 of projecting a pixel 410 from a screen space 405 to a texture space 415. For example, FIG. 4 depicts the pixel 410 in the screen space 405. The example illustration 400 also includes a projection of the pixel 410 into the texture space 415. For example, a desired image 420 (sometimes referred to as a "virtual level" or a "virtual layer") in the texture space 415 may represent an ideal projection of the pixel 410 from the screen space 405 to the texture space 415. In the illustrated example, the desired image 420 comprises a footprint 422 that represents an area of texels of the texture space 415 at the virtual level.

Figure 5:
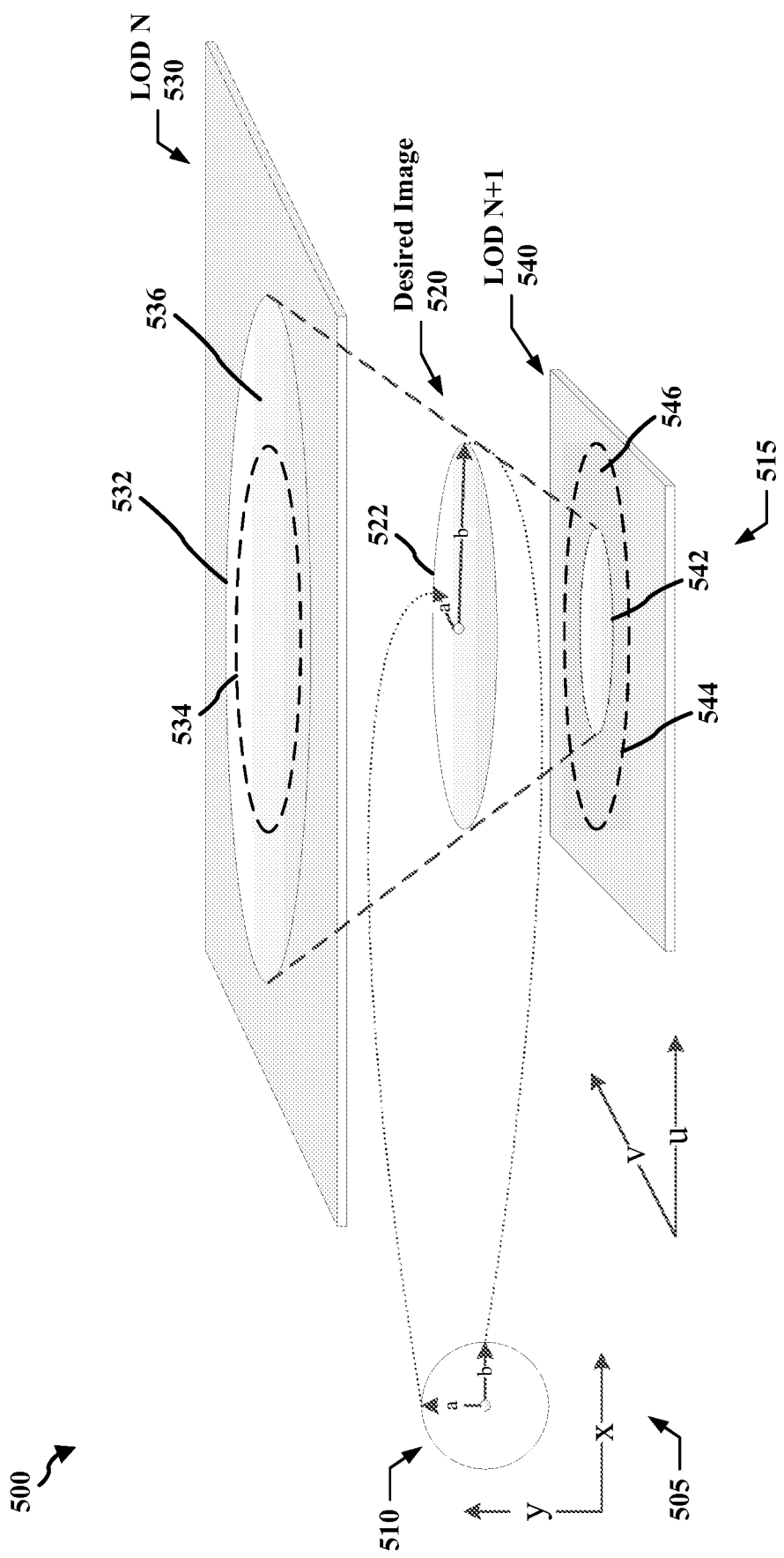

Similarly, FIG. 5 depicts an example illustration 500 of projecting a pixel 510 from a screen space 505 to a texture space 515. FIG. 5 also depicts a desired image 520 that represents an ideal projection of the pixel 510 from the screen space 505 to the texture space 515. In the illustrated example, the desired image 520 comprises a footprint 522 that represents an area of texels of the texture space 515 at the virtual level.

As shown in FIGS. 4 and/or 5, the texture size of the desired image 420, 520 may not map into a mip-map layer. For example, the texture size of the desired image 420, 520 is less than the texture size of a lower mip-map layer (e.g., an LOD N layer 430, 530) and is greater than the texture size of a higher mip-map layer (e.g., an LOD N+1 layer 440, 540). For example, referring to the illustration 500 and the mip-map image configuration 300 of FIG. 3, the texture size of the desired image 520 may be 10×10, the texture size of the lower mip-map layer (e.g., the LOD N layer 530) may be 16×16 (e.g., the first mip-map layer 302), and the texture size of the higher mip-map layer (e.g., the LOD N+1 layer 540) may be 8×8 (e.g., the second mip-map layer 304). Since the texture size of the desired image 420, 520 does not map into one of the mip-map layers, the pixel 410, 510 is projected from the screen space 405, 505 to the two closest, available mip-map layers (e.g., the LOD N layer 430, 530 and the LOD N+1 layer 440, 540). For example, the pixel 510 may be projected from the screen space 505 to the lower mip-map layer (e.g., the LOD N layer 530 corresponding to the first mip-map layer 302) and to the higher mip-map layer (e.g., the LOD N+1 layer 540 corresponding to the second mip-map layer 304).

By projecting the pixel 410, 510 to the two closest, available mip-map layers, disclosed techniques are able to select more texels from the higher resolution (or higher detailed) mip-map layer (e.g., the LOD N layer 430, 530) and fewer texels from the lower resolution (or lower detail) mip-map layer (e.g., the LOD N+1 layer 440, 540).

Similar to the desired image, each of the mip-map layers are also associated with a footprint. For example, the LOD N layer 430 of FIG. 4 comprises a lower mip-map layer footprint 432 and the LOD N+1 layer 440 comprises a higher mip-map layer footprint 442. The LOD N layer 530 of FIG. 5 comprises a lower mip-map layer footprint 532 and the LOD N+1 layer 530 comprises a higher mip-map layer footprint 542. The footprints represent a total area of the texture space from which texels are fetched for sampling.

It may be appreciated that if the size of each footprint in the texture space is the same (e.g., the footprints 522, 532, 542 of the texture space 515), then texels within the projection in the lower mip-map layer may not be sampled and/or texels outside the projection in the higher mip-map layer may be sampled. For example, FIG. 5 illustrates a virtual lower mip-map layer footprint 534 at the lower mip-map layer that is the same size as the footprint 522 of the desired image 520. As shown in FIG. 5, the lower mip-map layer (e.g., the LOD N layer 530) comprises an area 536 that corresponds to texels that may not be sampled due to being within the lower mip-map layer footprint 532 and outside the virtual lower mip-map layer footprint 534. In such examples, it may be possible that the quality of the image may be reduced (after filtering) as the texels selected for sampling may not be representative of the projection of the pixel 510 onto the texture space 515.

FIG. 5 also illustrates a virtual higher mip-map layer footprint 544 at the higher mip-map layer that is the same size as the footprint 522 of the desired image 520. As shown in FIG. 5, the higher mip-map layer (e.g., the LOD N+1 layer 540) comprises an area 546 that corresponds to texels that may be sampled due to being within the virtual higher mip-map layer footprint 544, but that are not included in the higher mip-map layer footprint 542. In such examples, it may be possible that the quality of the image may be reduced (after filtering) as the texels selected for sampling may be outside the projection of the pixel 510 in the texture space 515. For example, texture data for texels within the area 546 may be selected for sampling and skew the output of the filtering.

FIG. 6A depicts a first example illustration 600 of samples at a higher mip-map layer. FIG. 6B depicts a second example illustration 620 of samples at a higher mip-map layer. FIG. 6C depicts a third example illustration 650 of samples at a higher mip-map layer. FIGS. 6A, 6B, and 6C include a virtual layer 602 that corresponds to the desired image 420, 520 of FIGS. 4 and/or 5. In the illustrated examples, the virtual layer 602 comprises four example virtual samples 604, 606, 608, 610. The virtual samples 604, 606, 608, 610 define a footprint 612. The footprint 612 may be implemented by the footprint 422 of the desired image 420 of FIG. 4 and/or the footprint 522 of the desired image 520 of FIG. 5.

In the illustrated example of FIG. 6A, the illustration 600 also includes an LOD N+1 layer 614 (e.g., a higher mip-map layer) that corresponds to the LOD N+1 layer 440, 540 of FIGS. 4 and/or 5. The LOD N+1 layer 614 comprises a footprint 612a that is smaller than the footprint 612 of the virtual layer 602. For example, the footprint 612a may correspond to the higher mip-map layer footprint 542 of FIG. 5. In the illustrated example of FIG. 6A, the quantity of filter samples of the LOD N+1 layer 614 is the same as the quantity of virtual samples of the virtual layer 602. For example, the LOD N+1 layer 614 comprises four filter samples 604a, 606a, 608a, 610a. However, as shown in FIG. 6A, to maintain the same quantity of samples within a smaller footprint, the four filter samples 604a, 606a, 606a, 608a overlap. As a result, it may be appreciated that in some examples, filter taps selected from the four filter samples 604a, 606a, 608a, 610a may be non-unique. In such examples, performing texture filtering may result in performing computations using duplicate (or higher order repeating) texture data.

In the illustrated example of FIG. 6B, the illustration 620 includes an LOD N+1 layer 622 (e.g., a higher mip-map layer) that corresponds to the LOD N+1 layer 440, 540 of FIGS. 4 and/or 5. The LOD N+1 layer 622 comprises a footprint 612b that is the same size as the footprint 612 of the virtual layer 602. For example, the footprint 612b may correspond to the virtual higher mip-map layer footprint 544 of FIG. 5. In the illustrated example of FIG. 6B, the quantity of filter samples of the LOD N+1 layer 622 is the same as the quantity of virtual samples of the virtual layer 602. For example, the LOD N+1 layer 622 comprises four filter samples 604b, 606b, 608b, 610b. However, to maintain the same quantity of samples as the virtual layer 602 while also avoiding the occurrence of overlapping samples (as shown in FIG. 6A), the footprint 612b of FIG. 6B is the same size as the footprint 612 of the virtual layer 602. As a result, it may be appreciated that filter taps selected from the four filter samples 604b, 606b, 608b, 610b of FIG. 6B may be unique (e.g., not the same as another filter tap). However, it may be possible that filter taps selected from the four filter samples 604b, 606b, 608b, 610b may be selected from outside the projection of the pixel in the LOD N+1 layer. For example, in the example of FIG. 5, the footprint 542 corresponds to the projection of the pixel 510 from the screen space 505 to the texture space 515 at the desired image size 520. When using a footprint that is larger than the footprint 542 (e.g., the virtual higher mip-map layer footprint 544), filter taps from the area 546 may be selected. However, such filter taps are not representative of the projection of the pixel 510 onto the texture space 515 and, thus, may result in performing computations using extra texture data that skews (or bleeds) into the output of the texture filter.

Thus, it may be appreciated that when selecting samples for the higher mip-map layer, it may be beneficial to select samples that are non-overlapping (e.g., to reduce performing computations on duplicate texture data), but still provide for a smaller footprint than the virtual layer (e.g., to reduce performing computations on extra texture data). Example techniques disclosed herein facilitate reducing the quantity of samples at the higher mip-map layer to enable selecting samples that are non-overlapping, but still provide for a smaller footprint than the virtual layer.

In the illustrated example of FIG. 6C, the illustration 650 includes an LOD N+1 layer 652 (e.g., a higher mip-map layer) that corresponds to the LOD N+1 layer 440, 540 of FIGS. 4 and/or 5. The LOD N+1 layer 652 comprises a footprint 612c that is smaller than the footprint 612 of the virtual layer 602. For example, the footprint 612c may correspond to the higher mip-map layer footprint 542 of FIG. 5. In the illustrated example of FIG. 6C, the quantity of filter samples of the LOD N+1 layer 652 is smaller than the quantity of virtual samples of the virtual layer 602. For example, the LOD N+1 layer 652 comprises two filter samples 654, 656. As shown in FIG. 6C, the two filter samples 654, 656 are non-overlapping samples and, thus, reduce the occurrence of performing computations on duplicate texture data due to, for example, selecting non-unique filter taps.

Additionally, as shown in FIG. 6C, the footprint 612c of the LOD N+1 layer 652 is smaller than then the footprint 612 of the virtual layer 602. As a result, filter taps selected from within the footprint 612c (e.g., from the two filter samples 654, 656) are more representative of the projection of the pixel 510 onto the texture space 515 and, thus, may reduce the occurrence of performing computation using extra texture data that skews (or bleeds) into the output of the texture filter.

Figure 7:
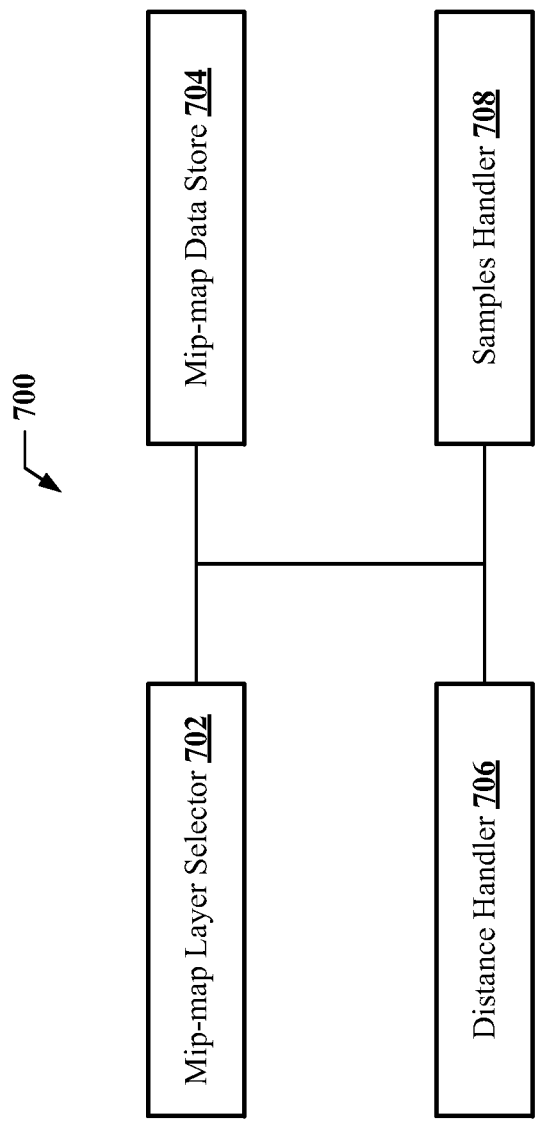
FIG. 7 illustrates an example implementation of a texture engine, in accordance with one or more techniques of this disclosure.

FIG. 7 illustrates an example implementation of a texture engine 700. The example texture engine 700 may include aspects of the example texture engine 298 of FIG. 2. The example texture engine 700 may facilitate determining a quantity of samples to select from a higher mip-map layer (e.g., an LOD N+1 layer) when performing texture filtering. In the illustrated example, the quantity of samples selected from the higher mip-map layer (e.g., the LOD N+1 layer) is less than a quantity of samples selected from a lower mip-map layer (e.g., an LOD N layer). Additionally, the samples selected for each mip-map layer may comprise a respective quantity of filter taps. A filter tap may be selected from a sample and input to a texture filter. For example, a texture filter may comprise a linear combination of inputs and the filter taps may correspond to the inputs of the texture filter. Thus, the example texture engine 700 enables selecting a relatively smaller total quantity of samples for performing texture filtering, which may reduce processing times and/or workloads. For example, each sample may be associated with Z filter taps. By reducing the total quantity of samples (e.g., from eight samples in FIGS. 6A and 6B to six samples in FIG. 6C), the total quantity of filter taps may be reduced form 8*Z to 6*Z, thereby reducing the quantity of inputs to the texture filter and the processing workload associated with performing the texture filtering.

In the illustrated example of FIG. 7, the texture engine 700 includes a mip-map layer selector 702, a mip-map data store 704, a distance handler 706, and a samples handler 708. However, it may be appreciated that the texture engine 700 and/or a component of the texture engine 700 (e.g., the mip-map layer selector 702, the mip-map data store 704, the distance handler 706, and/or the samples handler 708) may be implemented by the processing unit 120 (and/or generally the device 104 of FIG. 1).

The example texture engine 700 of FIG. 7 includes the mip-map layer selector 702 to facilitate selecting and retrieving mip-map layers. The example mip-map layer selector 702 may select two mip-map layers based on a desired image size. For example, the desired image size may be a 10×10 size image. The mip-map layer selector 702 may then select a first mip-map layer that is larger than and closest to the desired image size. Referring to the mip-map image configuration 300 of FIG. 3, the mip-map layer selector 702 may select the first mip-map layer 302 (LOD 0 layer) corresponding to the 16×16 size texture map. The mip-map layer selector 702 may then select a second mip-map layer that is smaller than and closest to the desired image size. For example, the mip-map layer selector 702 may select the second mip-map layer 304 (LOD 1 layer) corresponding to the 8×8 size texture map. The mip-map layer selector 702 may retrieve the selected mip-map layers from the mip-map data store 704.

The example texture engine 700 of FIG. 7 includes the mip-map data store 704 to store pre-generated mip-map image configurations, such as the mip-map image configuration 300 of FIG. 3. The pre-generated mip-map image configurations may be retrieved by the mip-map layer selector 702. It may be appreciated that the mip-map data store 704 may be implemented by the internal memory 121 of FIG. 1, the memory 124 of FIG. 1, and/or the memory 240 of FIG. 2.

The example texture engine 700 of FIG. 7 includes the distance handler 706 to determine a relative distance between the first selected mip-map layer (e.g., the LOD 0 layer) and the desired image with respect to the second selected mip-map layer (e.g., the LOD 1 layer). In some examples, the distance handler 706 may determine the relative distance based on respective measurements of a dimension of the first selected mip-map layer (e.g., the LOD 0 layer), the desired image, and the second selected mip-map layer (e.g., the LOD 1 layer). For example, in the example, the first selected mip-map layer (e.g., the LOD 0 layer) may have a size "16" in a first dimension, the desired image may have a size "10" in the first dimension, and the second selected mip-map layer (e.g., the LOD 1 layer) may have a size "8" in the first dimension.

The example distance handler 706 may apply the different sizes of the selected mip-map layers and the desired image to Equation 1 (below) to determine the relative distance.

$$\text{Distance} = (\text{size}_{LODN} - \text{size}_{desiredImage}) / (\text{size}_{LODN} - \text{size}_{LODN+1}) \quad \text{Equation 1:}$$

In Equation 1, the parameter "distance" represents the relative distance, the parameter "size_LOD N" represents the size of the lower mip-map layer (e.g., the first selected mip-map layer (LOD 0 layer)) in a first dimension, the parameter "size_desiredImage" represents the size of the desired image in the first dimension, and the parameter "size_LODN+1" represents the size of the higher mip-map layer (e.g., the second selected mip-map layer (LOD 1 layer)) in the first dimension. Thus, the numerator of Equation 1 represents the distance from the first selected mip-map layer (LOD 0 layer) to the desired image, and the denominator of Equation 1 represents the total distance from the first selected mip-map layer (LOD 0 layer) to the second selected mip-map layer (LOD 1 layer). It may be appreciated that since the successive mip-map layers are half the size as the previous, lower mip-map layer, the total distance from the first selected mip-map layer to the second selected mip-map layer may be represented as the parameter "size_LODN+1." In the example, by applying the respective sizes to Equation 1, the distance handler 706 may determine the relative distance as (16−10)/(8)=0.75.

The example texture engine 700 of FIG. 7 includes the samples handler 708 to determine a quantity of samples to sample from the first selected mip-map layer (LOD 0 layer) and the second selected mip-map layer (LOD 1 layer). In some examples, the samples handler 708 may determine a first mip-map layer samples quantity based on a ratio of the size of the first selected mip-map layer (LOD 0 layer) in a direction to the size of the desired image in the direction. For example, the samples handler 708 may determine the as first mip-map layer samples quantity as 16/10=1.6. Accordingly, in the example, the samples handler 708 may determine to select 1.6 samples from the first selected mip-map layer (LOD 0 layer).

The samples handler 708 may then determine a quantity of samples to sample from the second selected mip-map layer (LOD 1 layer) based on the first selected mip-map layer samples quantity (e.g., 1.6) and the determined relative distance (e.g., 0.75). In the illustrated example, the samples handler 708 may apply Equation 2 (below) to determine the second mip-map layer samples quantity.

$$\text{Samples}_{higherMipMapLayer} = \text{Samples}_{lowerMipMapLayer} / (2 - \text{Distance}) \quad \text{Equation 2:}$$

In Equation 2, the parameter "Samples higherMipMapLayer" represents the quantity of samples selected from the higher mip-map layer (e.g., the second selected mip-map layer (LOD 1 layer)), the parameter "Samples lowerMipMapLayer" represents the quantity of samples selected from the lower mip-map layer (e.g., the first selected mip-map layer (LOD 0 layer)), and the parameter "Distance" represents the relative distance determined by the distance handler 706. In the example, by applying the respective values to Equation 2, the samples handler 708 may determine the second selected mip-map layer samples quantity as (1.6)/(2−0.75)=1.28.

It may be appreciated that other techniques may additionally or alternatively be used for determining the second selected mip-map layer samples quantity. That is, while the second selected mip-map layer samples quantity may be determined as a relationship between the first selected mip-map layer samples quantity and the relative distance, the specific values provided in Equation 2 (above) are merely illustrative. Thus, it may be appreciated that the second selected mip-map layer samples quantity may be determined generally using Equation 3 (below).

$$\text{Samples}_{higherMipMapLayer} = f(\text{Samples}_{LowerMipMapLayer}, \text{Distance}) \quad \text{Equation 3:}$$

As shown above, by basing the quantity of samples selected from the higher mip-map layer (e.g., the LOD N+1 layer) as a fraction of the quantity of samples selected from the lower mip-map layer (e.g., the LOD N layer) and based on the relative distance from the lower mip-map layer (e.g., the LOD N layer) to the desired image, the quantity of samples selected from the higher mip-map layer (e.g., the LOD N+1 layer) may be less than the quantity of samples selected from the lower mip-map layer (e.g., the LOD N layer). Accordingly, the total quantity of samples selected and the total quantity of filter taps processed may be reduced when compared to, for example, techniques that select the same quantity of samples from each mip-map layer. Furthermore, by determining the second quantity of samples as a relationship of the relative distance and the first quantity of samples, it may be appreciated that as the relative distance between the second mip-map layer (e.g., the LOD N+1 layer) and the desired image layer decreases, then the second quantity of samples selected from the second mip-map layer (e.g., the LOD N+1 layer) also decreases. For example, as the relative distance approaches zero, the quantity of samples selected from the second (or higher) mip-map layer (e.g., the LOD N+1 layer) also approaches zero. Furthermore, if the size of the image is the same as the size of the first mip-map layer (e.g., the relative distance is zero), then all the corresponding samples may be selected from the first mip-map layer (e.g., the LOD N layer), or, alternatively, the first mip-map layer (e.g., the LOD N layer) may be used for the desired image.

Figure 8:
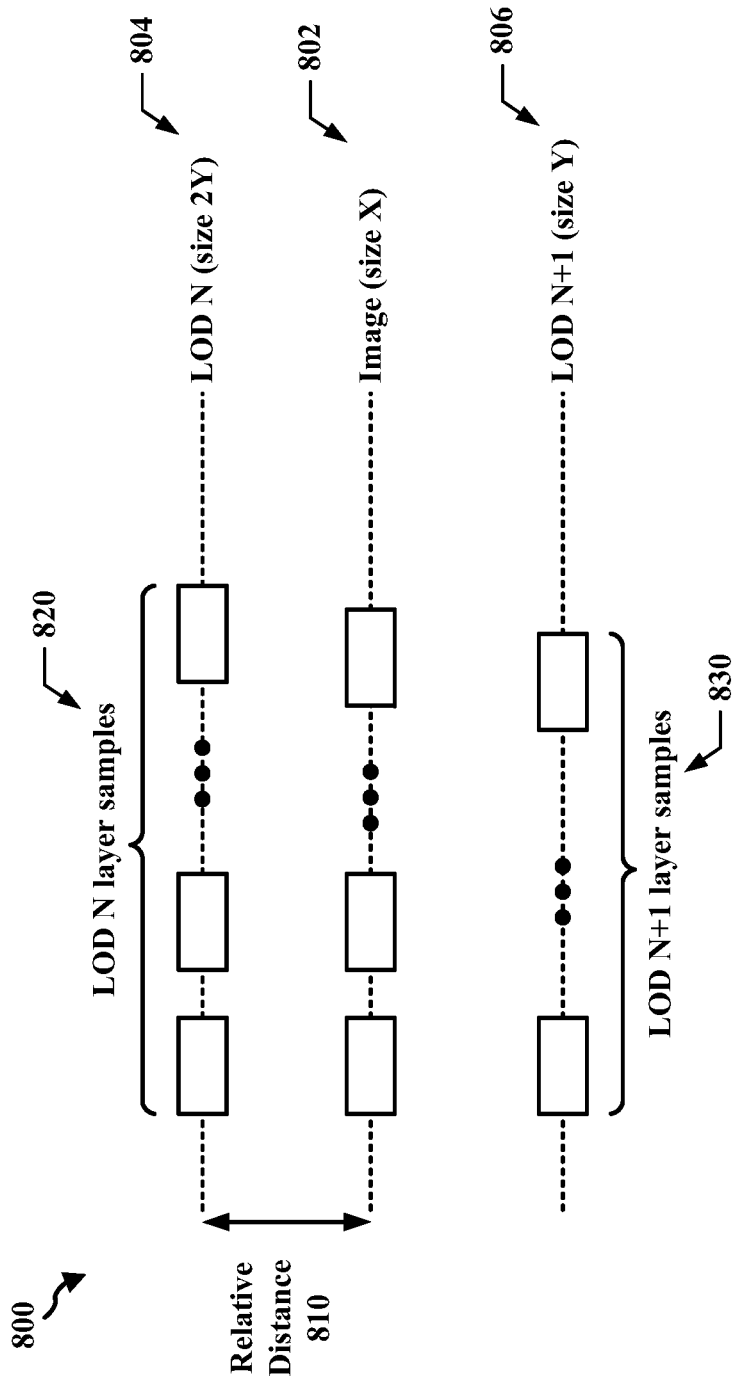
FIG. 8 illustrates an example diagram depicting illustrative quantities of samples to select from different mip-map layers, in accordance with the techniques of this disclosure.

FIG. 8 illustrates an example diagram 800 depicting illustrative quantities of samples to select from different mip-map layers, in accordance with the techniques of this disclosure. The example diagram 800 includes an image layer 802, a lower or first mip-map layer 804 (LOD N layer), and a higher or second mip-map layer 806 (LOD N+1 layer). The image layer 802 may be associated with an image texture size X in a first dimension. The first mip-map layer 804 may be associated with a first mip-map texture size 2Y in the first dimension, and the second mip-map layer 806 may be associated a second mip-map texture size Y in the first dimension.

In the illustrated example, the image layer 802 corresponds to the desired image size, and the two mip-map layers 804, 806 correspond to the two mip-map layers closest to the desired image size. For example, referring to the texture engine 700 of FIG. 7, the mip-map layer selector 702 may select the mip-map layer that is closest to and larger than the desired image size (e.g., the first mip-map layer 804), and may select the mip-map layer that is closest to and smaller than the desired image size (e.g., the second mip-map layer 806).

In the illustrated example of FIG. 8, a relative distance 810 may be determined with respect to (1) a distance between the first mip-map layer 804 and the image layer 802 and (2) a distance between the first mip-map layer 804 and the second mip-map layer 806. For example, referring to the texture engine 700, the distance handler 706 may apply Equation 1 (above) to determine the relative distance 810.

In the illustrated example of FIG. 8, LOD N layer samples 820 represent the first mip-map layer samples quantity (or the quantity of samples selected from the lower mip-map layer 804). For example, referring to the texture engine 700 of FIG. 7, the samples handler 708 may use a ratio of the size of the LOD N layer (e.g., 2Y) to the size of the image layer (e.g., X) to determine the quantity of samples of the LOD N layer samples 820 (e.g., 2Y/X).

In the illustrated example of FIG. 8, LOD N+1 layer samples 830 represent the second mip-map layer samples quantity (or the quantity of samples selected from the higher mip-map layer 806). For example, referring to the texture engine 700 of FIG. 7, the samples handler 708 may apply Equation 2 (above) (or, generally Equation 3 (above)) to determine the quantity of samples of the LOD N+1 layer samples 830.

As described above, each sample may be associated with a quantity of filter taps that are input into a texture filter. By reducing the total quantity of samples, disclosed techniques enable reducing the total quantity of inputs to the texture filter. Moreover, as described above in connection with FIG. 6C, disclosed techniques enable reducing the size of the higher mip-map layer footprint while maintaining a same (or similar) density of samples within the footprint when samples overlapping does not occur (as shown in FIG. 6B). By reducing the size of the footprint and maintain the density of samples within the footprint, disclosed techniques enable maintaining the quality of the image and facilitate reducing the processing workload of performing texture filtering.

Figure 9:
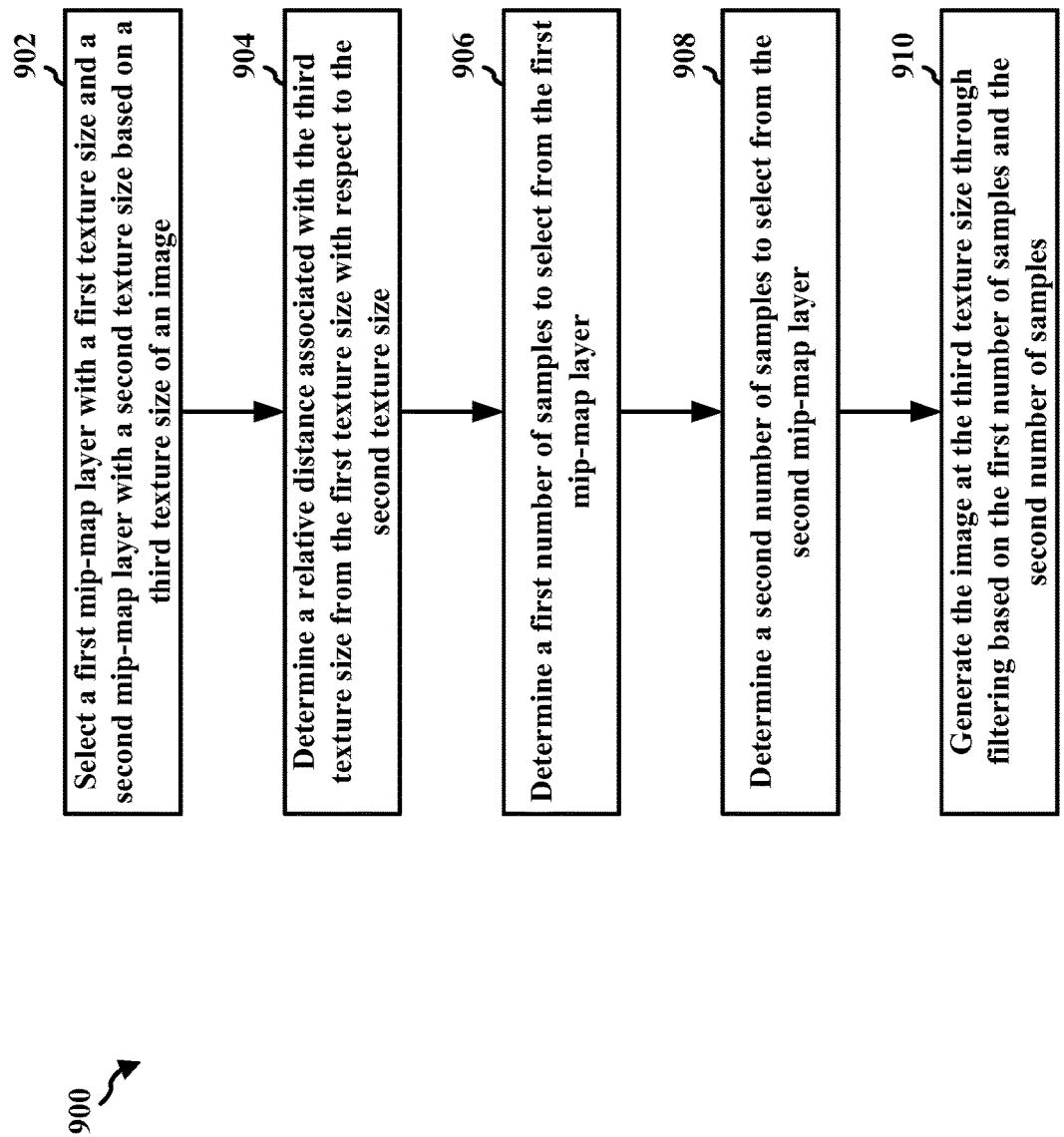
FIG. 9 illustrates an example flowchart of an example method, in accordance with one or more techniques of this disclosure.

FIG. 9 illustrates an example flowchart 900 of an example method in accordance with one or more techniques of this disclosure. The method may be performed by a GPU or apparatus for graphics processing, such as the example texture engine 700 of FIG. 7. At 902, the apparatus may select a first mip-map layer with a first texture size and a second mip-map layer with a second texture size based on a third texture size of an image, as described above in connection with the examples in FIGS. 2, 3, 4, 5, 6A, 6B, 6C, 7, and/or 8. For example, the mip-map layer selector 702 of the texture engine 702 may be configured to select the first mip-map layer and the second mip-map layer. In some examples, the mip-map layer selector 702 may select the first mip-map layer and the second mip-map layer from a data store, such as the example mip-map data store 704 of the texture engine 700. For example, the mip-map layer selector 702 may select the first mip-map layer and the second mip-map layer from a mip-map image configuration, such as the example mip-map image configuration 300 of FIG. 3. In some examples, the first texture size (e.g., an LOD N layer) may be larger than the third texture size (e.g., a desired image size), and the second texture size (e.g., an LOD N+1 layer) may be smaller than the third texture size (e.g., the desired image size). In some examples, the second texture size may be size Y in a first dimension, the first texture size may be size 2Y in the first dimension, and the third texture size may be size X in the first dimension. In certain such examples, the third texture size (size X) may be greater than the second texture size (size Y), but less than the first texture size (size 2Y).

At 904, the apparatus may determine a relative distance associated with the third texture size from the first texture size with respect to the second texture size, as described above in connection with the examples in FIGS. 2, 3, 4, 5, 6A, 6B, 6C, 7, and/or 8. For example, the distance handler 706 of the texture engine 700 may be configured to determine the relative distance associated with the third texture size from the first texture size with respect to the second texture size. In some examples, the apparatus may determine the relative distance as a ratio of (1) the distance from the first mip-map layer (e.g., the LOD N layer) to the image layer (e.g., the desired image layer) and (2) the distance from the first mip-map layer (e.g., the LOD N layer) to the second mip-map layer (e.g., the LOD N+1 layer). For example, the apparatus may apply Equation 1 (reproduced below) to determine the relative distance.

$$\text{Distance} = (\text{size}_{LODN} - \text{size}_{desiredImage})/(\text{size}_{LODN} - \text{size}_{LODN+1}) \quad \text{Equation 1:}$$

At 906, the apparatus may determine a first quantity of samples to select from the first mip-map layer (e.g., the LOD N layer), as described above in connection with the examples in FIGS. 2, 3, 4, 5, 6A, 6B, 6C, 7, and/or 8. For example, the samples handler 708 of the texture engine 700 may be configured to determine the first quantity of samples to select from the first mip-map layer. In some examples, the samples handler 708 may use a ratio of the size of the first mip-map layer (e.g., 2Y) to the size of the image layer (e.g., X) to determine the first quantity of samples to select from the first mip-map layer (e.g., 2Y/X).

At 908, the apparatus may determine a second quantity of samples to select from the second mip-map layer (e.g., the LOD N+1 layer), as described above in connection with the examples in FIGS. 2, 3, 4, 5, 6A, 6B, 6C, 7, and/or 8. For example, the samples handler 708 of the texture engine 700 may be configured to determine the second quantity of samples to select from the second mip-map layer. In some examples, the second quantity of samples may be based on a relationship between the relative distance (e.g., determined at 904) and the first quantity of samples (e.g., determined at 906). For example, the apparatus may apply Equation 2 (reproduced below) (or, generally, Equation 3 (reproduced below)) to determine the second quantity of samples.

$$\text{Samples}_{higherMipMapLayer} = \text{Samples}_{lowerMipMapLayer}/(2-\text{Distance}) \quad \text{Equation 2:}$$

$$\text{Samples}_{higherMipMapLayer} = f(\text{Samples}_{lowerMipMapLayer}, \text{Distance}) \quad \text{Equation 3:}$$

However, it may be appreciated that other example techniques for determining the second quantity of samples to select from the second mip-map layer (e.g., the LOD N+1 layer) may additionally or alternatively be used by the apparatus. By basing the second quantity of samples on the relative distance and the first quantity of samples, it may be appreciated that as the relative distance between the second mip-map layer (e.g., the LOD N+1 layer) and the image layer decreases, then the second quantity of samples selected from the second mip-map layer (e.g., the LOD N+1 layer) also decreases. Moreover, by reducing the second quantity of samples, the total quantity of samples is reduced and the total quantity of filter taps applied to a texture filter is also reduced.

At 910, the apparatus may generate the image at the third texture size through filtering based on the first quantity of samples and the second quantity of samples, as described above in connection with the examples in FIGS. 2, 3, 4, 5, 6A, 6B, 6C, 7, and/or 8. For example, the apparatus may be configured to generate the image at the third texture size by inputting the filter taps corresponding to the samples of the first mip-map layer and the second mip-map layer to a texture filter.

It may be appreciated that after the apparatus generates the image, the image may then be used. For example, the apparatus may store the generated image (e.g., via the internal memory 121 and/or the memory 124 of FIG. 1), may transmit the generated image (e.g., via the communication interface 126 of FIG. 1), may output the image to a display (e.g., via the communication interface 126 and/or the display client 131 of FIG. 1), and/or may display the image on a display (e.g., via the display client 131 of FIG. 1).

In one configuration, a method or apparatus for graphics processing is provided. The apparatus may be a GPU or some other processor that can perform graphics processing. In one aspect, the apparatus may be the processing unit 120 within the device 104, or may be some other hardware within device 104 or another device. The apparatus may include means for selecting a first mip-map layer with a first texture size and a second mip-map layer with a second texture size based on a third texture size of an image, the first texture size being larger than the third texture size, the second texture size being smaller than the third texture size. The apparatus may also include means for determining a relative distance associated with the third texture size from the first texture size with respect to the second texture size. The apparatus may also include means for determining a first quantity of samples to select from the first mip-map layer, the first quantity of samples comprising a first quantity of filter taps determining a second quantity of samples to select from the second mip-map layer based on a relationship between the determined relative distance and the first quantity of samples of the first mip-map layer, the second quantity of samples comprising a second quantity of filter taps, and where the second quantity of samples is less than the first quantity of samples, and the second quantity of filter taps is less than the first quantity of filter taps. The apparatus may also include means for generating the image at the third texture size through filtering based on the first quantity of samples of the first mip-map layer and the second quantity of samples of the second mip-map layer. The apparatus may also include means for determining the relative distance based on (2Y−X)/Y, where Y represents a first dimension of the second texture size, 2Y represents the first dimension of the first texture size, and X represents the first dimension of the third texture size, and where X is greater than Y and less than 2Y. The apparatus may also include means for determining the second quantity of samples based on the first quantity of samples multiplied by the inverse of two minus the determined relative distance. The apparatus may also include means for generating the image at the third texture size by inputting filter taps from the first mip-map layer and the second mip-map layer to a texture filter.

The subject matter described herein can be implemented to realize one or more benefits or advantages. For instance, the described graphics processing techniques can be used by GPUs or other graphics processors to enable reduced sampling for texture filtering. This can also be accomplished at a low cost compared to other graphics processing techniques. Moreover, the graphics processing techniques herein can improve or speed up the texture filtering. Further, the graphics processing techniques herein can improve a GPU's resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

The following examples are illustrative only and may be combined with aspects of other embodiments or teachings described herein, without limitation.

Example 1 is a method of operation of a graphics processor, comprising: selecting a first mip-map layer with a first texture size and a second mip-map layer with a second texture size based on a third texture size of an image, the first texture size being larger than the third texture size, the second texture size being smaller than the third texture size; determining a relative distance associated with the third texture size from the first texture size with respect to the second texture size; determining a first quantity of samples to select from the first mip-map layer, the first quantity of samples comprising a first quantity of filter taps; determining a second quantity of samples to select from the second mip-map layer based on a relationship between the determined relative distance and the first quantity of samples of the first mip-map layer, the second quantity of samples comprising a second quantity of filter taps, wherein the second quantity of samples is less than the first quantity of samples, and the second quantity of filter taps is less than the first quantity of filter taps; and generating the image at the third texture size through filtering based on the first quantity of samples of the first mip-map layer and the second quantity of samples of the second mip-map layer.

In Example 2, the method of Example 1 further includes that a footprint of the second texture size is less than a footprint of the third texture size.

In Example 3, the method of any of Example 1 or Example 2 further includes that a first dimension of the second texture size is Y, the first dimension of the first texture size is 2Y, and the first dimension of the third texture size is X, where X is greater than Y and less than 2Y.

In Example 4, the method of any of Examples 1 to 3 further includes that the relative distance is determined based on $(2Y-X)/Y$.

In Example 5, the method of any of Examples 1 to 4 further includes that the second quantity of samples is determined based on the first quantity of samples multiplied by an inverse of two minus the determined relative distance.

In Example 6, the method of any of Examples 1 to 5 further includes that the second quantity of samples decreases as the determined relative distance decreases.

In Example 7, the method of any of Examples 1 to 6 further includes that generating the image at the third texture size comprises inputting filter taps from the first mip-map layer and the second mip-map layer to a texture filter.

Example 8 is a device including one or more processors and one or more memories in electronic communication with the one or more processors storing instructions executable by the one or more processors to cause a system or an apparatus to implement a method as in any of Examples 1 to 7.

Example 9 is a system or apparatus including means for implementing a method or realizing an apparatus as in any of Examples 1 to 7.

Example 10 is a non-transitory computer-readable medium storing instructions executable by one or more processors to cause the one or more processors to implement a method as in any of Examples 1 to 7.

Various examples have been described. These and other examples are within the scope of the following claims.

What is claimed is:

1. A method of operation of a graphics processor, comprising:
    selecting a first mip-map layer with a first texture size and a second mip-map layer with a second texture size based on a third texture size of an image, the first texture size being larger than the third texture size, the second texture size being smaller than the third texture size;
    determining a relative distance associated with the third texture size from the first texture size with respect to the second texture size;

determining a first quantity of samples to select from the
first mip-map layer, the first quantity of samples comprising a first quantity of filter taps;
determining a second quantity of samples to select from
the second mip-map layer based on a relationship
between the relative distance and the first quantity of
samples of the first mip-map layer, the second quantity
of samples comprising a second quantity of filter taps,
wherein
the second quantity of samples is less than the first
quantity of samples, and
the second quantity of filter taps is less than the first
quantity of filter taps; and
generating the image at the third texture size through
filtering based on the first quantity of samples of the
first mip-map layer and the second quantity of samples
of the second mip-map layer.

2. The method of claim 1, wherein a footprint of the second texture size is less than a footprint of the third texture size.

3. The method of claim 1, wherein a first dimension of the second texture size is Y, a first dimension of the first texture size is 2Y, and a first dimension of the third texture size is X, where X is greater than Y and less than 2Y.

4. The method of claim 3, wherein the relative distance is determined based on $(2Y-X)/Y$.

5. The method of claim 1, wherein the second quantity of samples is determined based on the first quantity of samples multiplied by an inverse of two minus the relative distance.

6. The method of claim 1, wherein the second quantity of samples decreases as the relative distance decreases.

7. The method of claim 1, wherein generating the image at the third texture size comprises inputting filter taps from the first mip-map layer and the second mip-map layer to a texture filter.

8. An apparatus for graphics processing by a device, comprising:
a memory; and
at least one processor coupled to the memory and configured to:
select a first mip-map layer with a first texture size and
a second mip-map layer with a second texture size
based on a third texture size of an image, the first
texture size being larger than the third texture size,
the second texture size being smaller than the third
texture size;
determine a relative distance associated with the third
texture size from the first texture size with respect to
the second texture size;
determine a first quantity of samples to select from the
first mip-map layer, the first quantity of samples
comprising a first quantity of filter taps;
determine a second quantity of samples to select from
the second mip-map layer based on a relationship
between the relative distance and the first quantity of
samples of the first mip-map layer, the second quantity of samples comprising a second quantity of filter
taps, wherein
the second quantity of samples is less than the first
quantity of samples, and
the second quantity of filter taps is less than the first
quantity of filter taps; and
generate the image at the third texture size through
filtering based on the first quantity of samples of the
first mip-map layer and the second quantity of
samples of the second mip-map layer.

9. The apparatus of claim 8, wherein a footprint of the second texture size is less than a footprint of the third texture size.

10. The apparatus of claim 8, wherein a first dimension of the second texture size is Y, a first dimension of the first texture size is 2Y, and a first dimension of the third texture size is X, where X is greater than Y and less than 2Y.

11. The apparatus of claim 10, wherein the at least one processor is further configured to determine the relative distance based on $(2Y-X)/Y$.

12. The apparatus of claim 8, wherein the at least one processor is further configured to determine the second quantity of samples based on the first quantity of samples multiplied by an inverse of two minus the relative distance.

13. The apparatus of claim 8, wherein the second quantity of samples decreases as the relative distance decreases.

14. The apparatus of claim 8, wherein the at least one processor is configured to generate the image at the third texture size by inputting filter taps from the first mip-map layer and the second mip-map layer to a texture filter.

15. The apparatus of claim 8, wherein the apparatus comprises a wireless communication device.

16. A non-transitory computer-readable medium storing computer executable code for graphics processing, comprising code to:
select a first mip-map layer with a first texture size and a
second mip-map layer with a second texture size based
on a third texture size of an image, the first texture size
being larger than the third texture size, the second
texture size being smaller than the third texture size;
determine a relative distance associated with the third
texture size from the first texture size with respect to the
second texture size;
determine (1) a first quantity of samples to select from the
first mip-map layer, and (2) a second quantity of
samples to select from the second mip-map layer based
on a relationship between the relative distance and the
first quantity of samples of the first mip-map layer, the
first quantity of samples comprising a first quantity of
filter taps, the second quantity of samples comprising a
second quantity of filter taps, and wherein
the second quantity of samples is less than the first
quantity of samples, and
the second quantity of filter taps is less than the first
quantity of filter taps; and
generate the image at the third texture size through
filtering based on the first quantity of samples of the
first mip-map layer and the second quantity of samples
of the second mip-map layer.

17. The non-transitory computer-readable medium of claim 16, wherein a footprint of the second texture size is less than a footprint of the third texture size.

18. The non-transitory computer-readable medium of claim 16, wherein a first dimension of the second texture size is Y, a first dimension of the first texture size is 2Y, and a first dimension of the third texture size is X, where X is greater than Y and less than 2Y.

19. The non-transitory computer-readable medium of claim 18, wherein the relative distance is determined based on $(2Y-X)/Y$.

20. The non-transitory computer-readable medium of claim 16, wherein the second quantity of samples is determined based on the first quantity of samples multiplied by an inverse of two minus the relative distance.

21. The non-transitory computer-readable medium of claim 16, wherein the second quantity of samples decreases as the relative distance decreases.

22. The non-transitory computer-readable medium of claim 16, wherein the image is generated at the third texture size based on inputting filter taps from the first mip-map layer and the second mip-map layer to a texture filter.

* * * * *